(12) United States Patent
House et al.

(10) Patent No.: US 7,590,403 B1
(45) Date of Patent: Sep. 15, 2009

(54) WIRELESS DEVICE DORMANCY OVERRIDE

(75) Inventors: Eric Edward House, Emeryville, CA (US); Jim Susoy, Santa Cruz, CA (US)

(73) Assignee: Good Technology, Inc., Santa Clara, CA (US)

( * ) Notice: Subject to any disclaimer, the term of this patent is extended or adjusted under 35 U.S.C. 154(b) by 482 days.

(21) Appl. No.: 11/146,820

(22) Filed: Jun. 7, 2005

(51) Int. Cl.
*H04B 1/16* (2006.01)

(52) U.S. Cl. .......... 455/343.2; 455/343.3; 455/574; 370/311; 370/450

(58) Field of Classification Search .......... 455/574, 455/412.1, 418, 419, 420, 424, 425, 456.5, 455/456.6, 63.1, 67.11, 127.5, 127.1, 186.1, 455/278.1, 334, 407, 507, 343.2, 343.3; 235/462.46, 235/462.3, 472.01, 474.02; 340/7.38, 988, 340/445, 928, 929, 539.1, 539.3, 7.32, 7.36, 340/7.37; 370/311, 445, 449, 346, 349, 352, 370/355, 450
See application file for complete search history.

(56) References Cited

U.S. PATENT DOCUMENTS

| | | | | |
|---|---|---|---|---|
| 4,449,248 A * | 5/1984 | Leslie et al. | .............. | 340/7.36 |
| 5,095,308 A * | 3/1992 | Hewitt | .............. | 340/7.38 |
| 5,392,287 A * | 2/1995 | Tiedemann et al. | .............. | 370/311 |
| 5,953,677 A * | 9/1999 | Sato | .............. | 455/574 |
| 6,173,170 B1 * | 1/2001 | Komoda | .............. | 455/407 |
| 6,243,579 B1 * | 6/2001 | Kari | .............. | 455/426.1 |
| 6,256,492 B1 * | 7/2001 | Bilgic | .............. | 455/418 |
| 6,275,712 B1 * | 8/2001 | Gray et al. | .............. | 455/522 |
| 6,633,769 B2 * | 10/2003 | Shoobridge | .............. | 455/574 |
| 6,696,982 B2 * | 2/2004 | Yoshioka et al. | .............. | 340/988 |
| 6,829,493 B1 * | 12/2004 | Hunzinger | .............. | 455/574 |
| 2001/0053710 A1 * | 12/2001 | Gibbons et al. | .............. | 455/574 |
| 2002/0008145 A1 * | 1/2002 | Walsh et al. | .............. | 235/462.46 |
| 2005/0002414 A1 * | 1/2005 | Miyaoka | .............. | 370/445 |
| 2005/0049013 A1 * | 3/2005 | Chang et al. | .............. | 455/574 |
| 2005/0055731 A1 * | 3/2005 | Burnett | .............. | 725/141 |
| 2005/0154933 A1 * | 7/2005 | Hsu et al. | .............. | 713/320 |
| 2006/0082470 A1 * | 4/2006 | Zhu et al. | .............. | 340/928 |
| 2006/0234740 A1 * | 10/2006 | Sakoda | .............. | 455/507 |

\* cited by examiner

*Primary Examiner*—Duc Nguyen
*Assistant Examiner*—Charles Chow
(74) *Attorney, Agent, or Firm*—Blakely, Sokoloff, Taylor & Zafman LLP

(57) ABSTRACT

A wireless device is disclosed. The wireless device includes a radio module and an application. The radio module is used to communicate data on a wireless network. The application is used to facilitate the transition of the radio module from an active state to a dormant state. This transition occurs whenever data has not been communicated at the radio module for a predetermined time interval.

18 Claims, 4 Drawing Sheets

WIRELESS DEVICE DORMANCY OVERRIDE

FIELD OF THE INVENTION

The present invention relates to wireless devices; more particularly, the present invention relates to power management of a wireless device.

BACKGROUND

A variety of wireless data processing devices have been introduced over the past several years. These include wireless personal digital assistants ("PDAs") such as Palm® VIIx handheld, cellular phone equipped with data processing capabilities and more recently, corporate wireless messaging devices such as the Blackberry™ wireless pager developed by Research in Motion ("RIM")™.

While many of these wireless devices maintain a network data connection, their radio modules transition between an active state and a dormant state. The radio module enters into the active state in order to send or receive data. While the radio is in the active state, all incoming telephone calls go straight to voicemail. Also, when the radio module is in the active state the battery is drained at a much faster rate than when in the dormant state.

Various wireless networks (e.g., Code Division Multiple Access (CDMA)) benefit from the radio module remaining in the active state for a longer period of time because networks expend a significant amount of resources in order to switch the radio module between the dormant state and the active state. The resources are expended in order to locate a wireless device, which must occur before any data can be transmitted. Therefore, the networks have carrier configurable timeouts that prevent the wireless device from quickly reentering the dormant state. These timeouts can range from 10-20 seconds depending on the carrier. For a power user, a wireless device, due to these timeout values, could be in the active state for 25% of the time during business hours, thus making the wireless device unavailable to receive incoming calls as well as draining the battery at an unacceptable rate.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

According to one embodiment a power management mechanism for a wireless device is described. Reference in the specification to "one embodiment" or "an embodiment" means that a particular feature, structure, or characteristic described in connection with the embodiment is included in at least one embodiment of the invention. The appearances of the phrase "one embodiment" in various places in the specification are not necessarily all referring to the same embodiment.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Figure 1:
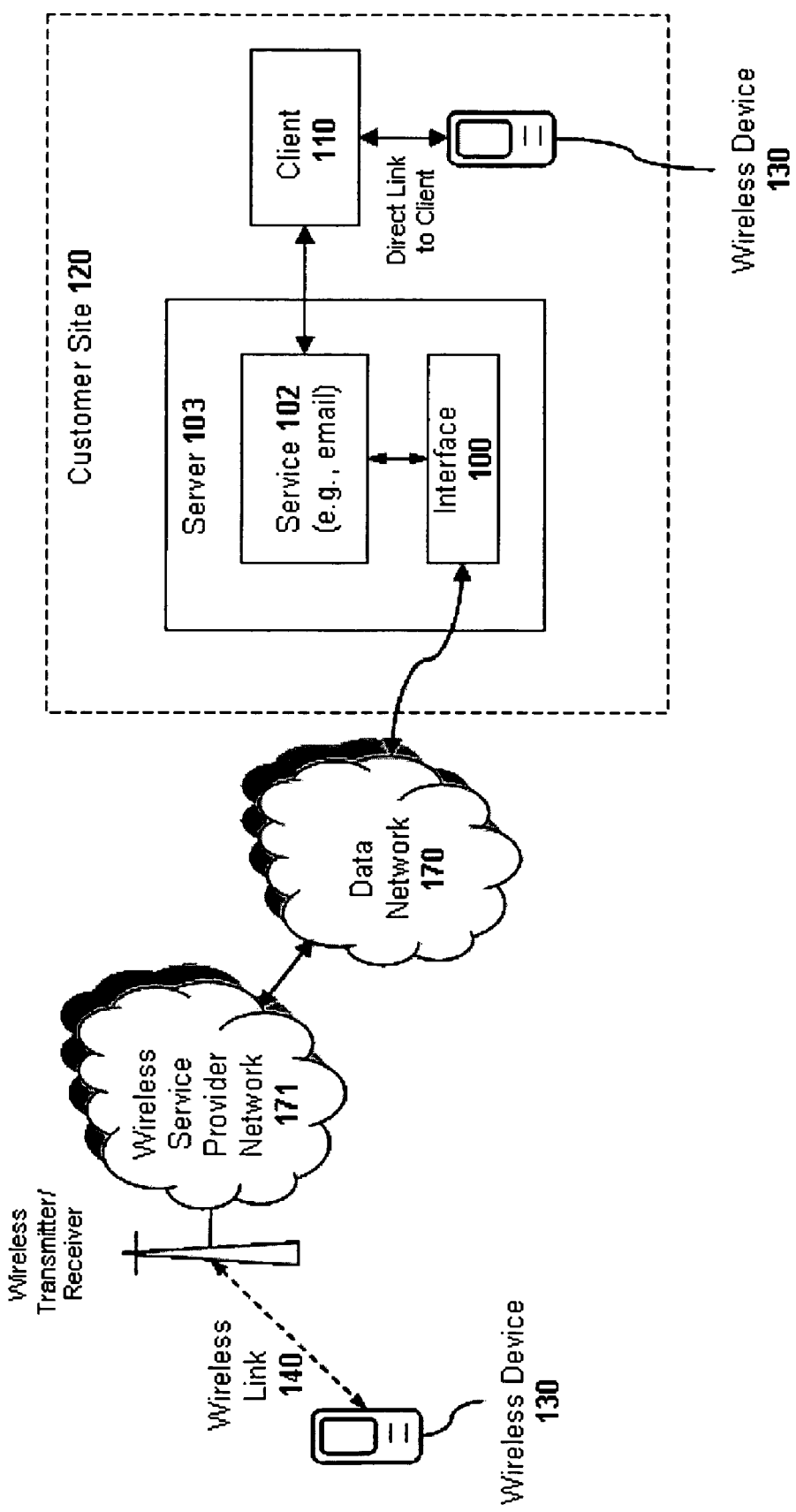
FIG. 1 illustrates one embodiment of a wireless network.

FIG. 1 illustrates one embodiment of a wireless network architecture including a customer site 120. Customer site 120 illustrated in FIG. 1 may be any local-area or wide-area network over which a plurality of servers 103 and clients 110 communicate. For example, customer site 120 may include all servers and clients maintained by a single corporation. Servers 103 may be configured to provide a variety of different messaging and groupware services 102 to network users (e.g., email, instant messaging, calendaring, . . . etc.). In one embodiment, these services are provided by Microsoft Exchange™. However, the underlying principles of the invention are not limited to any particular messaging/groupware platform.

In one embodiment of the invention, an interface 100 forwards data maintained by service 102 (e.g., email messages, instant messages, calendar data, . . . etc.) to a plurality of wireless data processing devices (represented in FIG. 1 by wireless device 130) via an external data network 170 and or a wireless service provider network 171. For example, if service 102 includes an email database, interface 100 forwards any new emails which arrive in a user's mailbox on service 102 to the user's wireless device 130 (over the network(s) 170 and or 171). Alternatively, or in addition, service 102 may forward the email to the user's local computer (e.g., client 110) (i.e., so that the user will receive the email on his/her wireless device 130 when out of the office and on his/her personal computer 110 when in the office). Conversely, email messages sent from the user's wireless device 130 are transmitted to service 102 via interface 100.

In one embodiment, interface 100 is a plug-in software module adapted to work with the particular service 120. It should be noted, however, that interface 100 may be implemented in hardware or any combination of hardware and software while still complying with the underlying principles of the invention.

In one embodiment, external data network 170 is comprised of a plurality of servers/clients (not shown) and other networking hardware (e.g., routers, hubs, . . . etc.) for forwarding data between interface 100 and wireless devices 130. In one embodiment, interface 100 encapsulates data in one or more packets containing an address identifying wireless devices. External data network 170 forwards the packets to wireless service provider network 171 which transmits the packets (or the data contained therein) over a wireless communication link to wireless device 130. In one embodiment, the wireless service provider network is a CDMA network. However, various other network types may be employed (e.g., 2-way Paging, PCS, . . . etc.) while still complying with the underlying principles of the invention.

It should be noted that network service provider network 171 and external data network 170 (and associated interface 100) may be owned/operated by the same organization or, alternatively, the owner/operator of external data network 170 may lease wireless services from the wireless service provider network. The underlying principles of the invention are not limited to any particular service arrangement.

Figure 2:
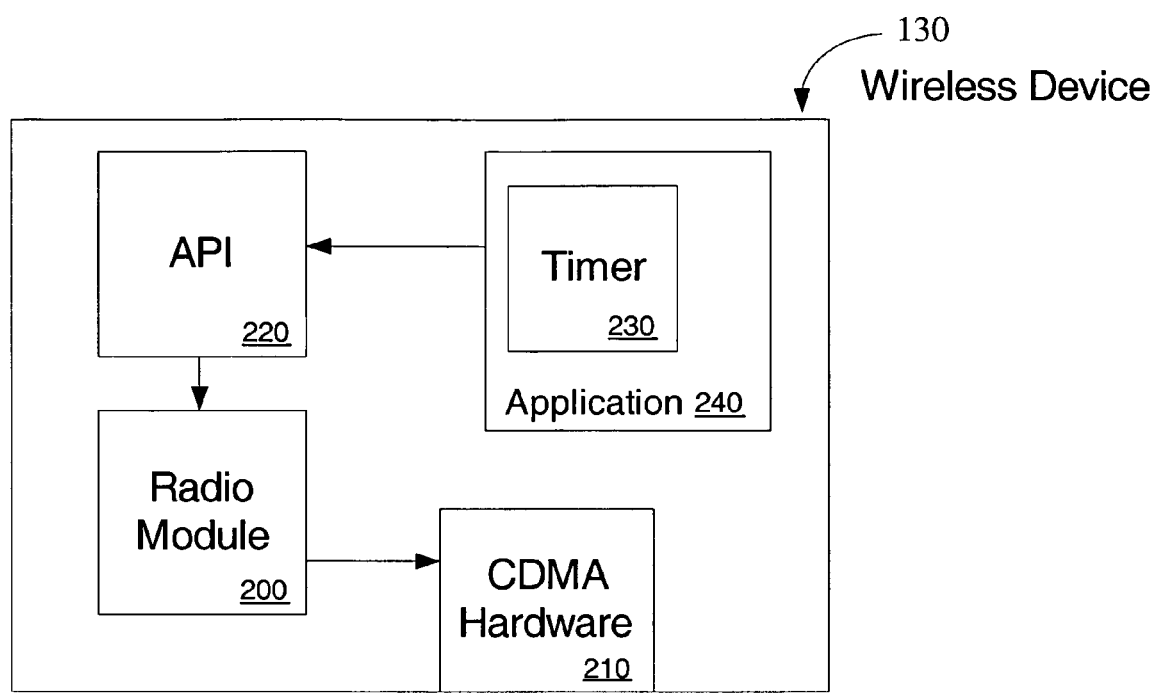
FIG. 2 illustrates a block diagram of one embodiment of a wireless device.

FIG. 2 illustrates a block diagram of one embodiment of a wireless device 130. Wireless device 130 includes radio module 200, CDMA hardware 210, application program interface (API) 220, and application 240 which includes timer 230.

Radio module 200 is a radio application that wirelessly connected to a wireless network, such as network 171 shown in FIG. 1, to transmit data to and receive data from the network. In one embodiment, radio module 200 receives timeout information from the network. In such an embodiment, the timeout information keeps radio module 200 in an active state, therefore preventing radio module 200 from switching to a dormant state, as previously discussed.

API 220 is used to facilitate communication between application 240 and radio module 200. In one embodiment, API 220 is included in the operating system (O/S) of device 130 and radio module 200 is included in firmware of device 130.

In one embodiment, application 240 is the GoodLink™ application developed by Good Technology® of Santa Clara, Calif. Application 240 maintains an internet connection, supports wireless synchronization of data and provides access to the World Wide Web (WWW).

In another embodiment, API 220 forces radio module 200 into the dormant state upon receiving a signal from timer 230 via application 240. Timer 230 is used to override the timeout information transmitted by the wireless network. In one embodiment, timer 230 is set to a predetermined time interval (e.g. 5 seconds) each time wireless device 130 transmits and or receives data. Timer allows radio module 200 to switch to the dormant state more quickly, as opposed to being forced to remain in the active state much longer by the network.

CDMA hardware 210 allows for wireless device 130 to transmit and receive data to and from the network. Radio module 200 switching to the dormant state allows wireless device 130 to conserve battery life, as well as enables wireless device 130 to receive incoming telephone calls, as opposed to sending them directly to voicemail.

Figure 3:
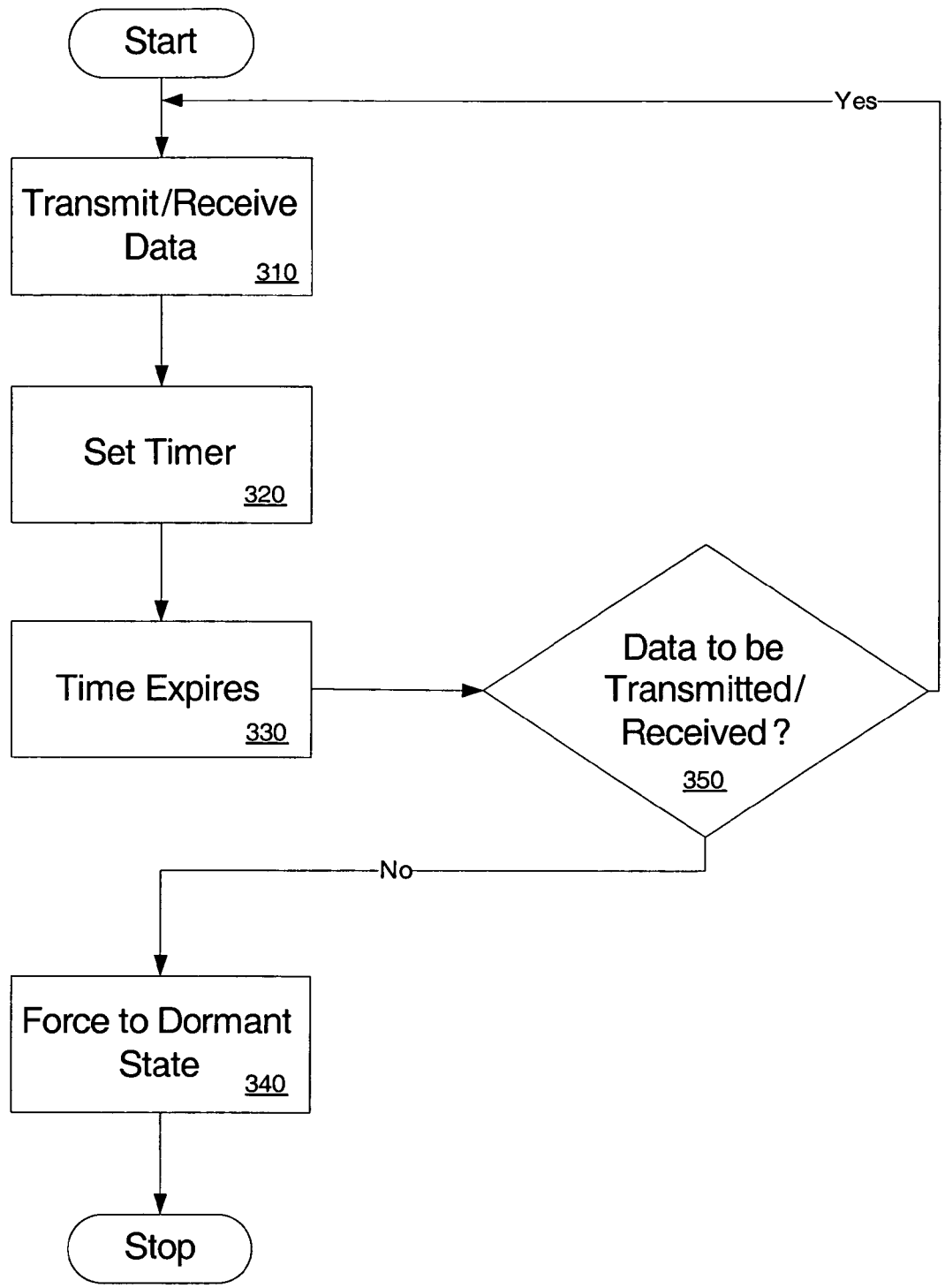
FIG. 3 is a flow diagram illustrating one embodiment of a radio module on a wireless device changing states.

FIG. 3 is a flow diagram illustrating one embodiment of a radio module on a wireless device changing states. At process block 310, wireless device 130 transmits data to the network, and receives data from the network. At process block 320, timer 230 is set to a predetermined time interval (e.g. 5 seconds). At process block 330, the time interval set by timer 230 expires.

At decision block 350, it is determined whether there is data to be transmitted and or received at device 130. If there is data to be transmitted and or received, the process moves back to process block 310 where data is transmitted to or received from the network. In one embodiment, the data to be received is an acknowledgment from server 103 indicating receipt of data recently transmitted from device 130. Even though timer 230 has expired (process block 330), device 130 remains in the active state if the acknowledgment has not yet been received.

If there is no data to be transmitted and or received and no pending acknowledgments, the process moves to process block 340 where device 130 is forced into the dormant state.

The power management mechanism described above transitions a wireless device to a dormant state sooner than would occur via a wireless network. Thus, the wireless device is able to conserve battery life. In addition, because the wireless device is in the dormant state for an increased amount of time, it is more often able to receive incoming telephone calls as opposed to sending the calls directly to voicemail.

Figure 4:
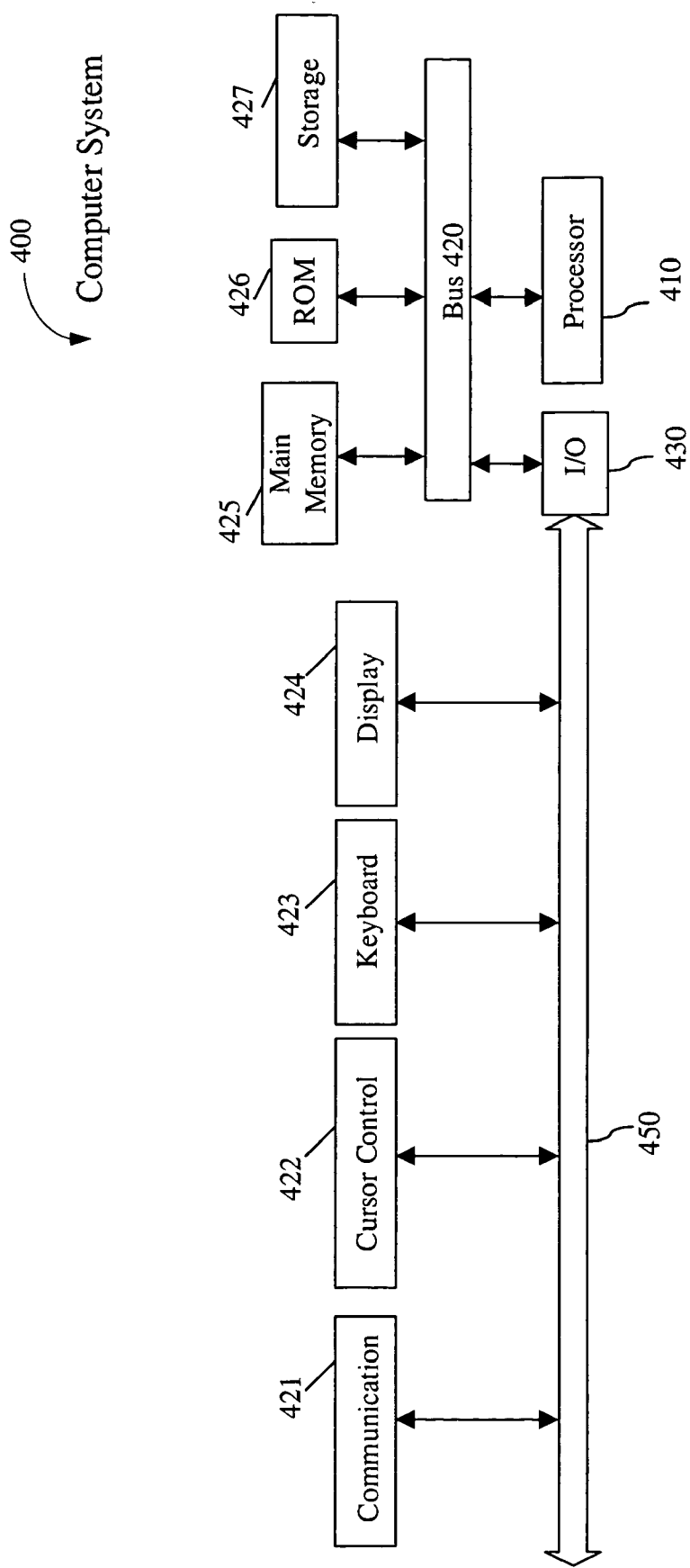
FIG. 4 illustrates a computer system.

FIG. 4 illustrates a computer system 400 on which wireless device 130 and or server 103 may be implemented. Computer system 400 includes a system bus 420 for communicating information, and a processor 410 coupled to bus 420 for processing information. According to one embodiment, processor 410 is implemented using one of the multitudes of ARM™ microprocessors. Nevertheless one of ordinary skill in the art will appreciate that other processors may be used.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 425 such as a magnetic disk or optical disc and its corresponding drive may also be coupled to computer system 400 for storing information and instructions. Computer system 400 can also be coupled to a second I/O bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients) via external data network 170. The communication device 421 may comprise a modem, a network interface card, or other well-known interface device, such as those used for coupling to Ethernet, token ring, or other types of networks.

Throughout the foregoing description, for the purposes of explanation, numerous specific details were set forth in order to provide a thorough understanding of the invention. It will be apparent, however, to one skilled in the art that the invention may be practiced without some of these specific details. For example, while illustrated as an interface 100 to a service 102 executed on a server 103 (see FIG. 1), it will be appreciated that the underlying principles of the invention may be implemented on a single client in which the client transmits data over a network.

Moreover, although described in the context of a wireless data processing device, the underlying principles of the invention may be implemented to compress data in virtually any networking environment, both wired and wireless. Accordingly, the scope and spirit of the invention should be judged in terms of the claims which follow.

What is claimed is:

1. A wireless device comprising:

a timer;

a power management mechanism to conserve battery power;

an application program interface API to control a radio module;

a radio module to receive timeout information via a wireless service provider network to maintain an active state; and an application to control said timer & said power management mechanism to facilitate the transition of the radio module from the active state to a dormant state whenever data has not been communicated at the radio module for a predetermined time interval by overriding the received timeout information.

2. The wireless device of claim 1 wherein the application comprises a timer to transmit a signal to the radio module upon reaching the predetermined time interval to override the timeout information received from the wireless network.

3. The wireless device of claim 2 further comprising an application program interface (API) to facilitate communication between the timer and the radio module.

4. The wireless device of claim 3 wherein the API forces the radio module into the dormant state.

5. The wireless device of claim 2 wherein the timer is set to the predetermined time interval each time the wireless device communicates data.

6. The wireless device of claim 1 further comprising code division multiple access (CDMA) hardware.

7. The wireless device of claim 1 wherein the radio module checks the wireless device to determine if data is waiting to be communicated, wherein the data waiting to be communicated is an acknowledgement from a server indicating receipt of recently communicated data.

8. The wireless device of claim 7 wherein if data is waiting to be communicated the wireless device remains in the active state.

9. A method comprising:
   controlling a radio module via a application program interface API;
   receiving data at a radio module via a wireless service provider network;
   activating a timer to count to a predetermined time interval upon receiving the data;
   receiving timeout information via the wireless network to maintain the radio module in an active state; and
   overriding the timeout information by forcing the radio module into a dormant state from the active state upon the timer reaching the predetermined time interval, to conserve battery power.

10. The method of claim 9 further comprising resetting the timer upon the radio module communicating data.

11. The method of claim 9 wherein the forcing of the radio module into the dormant state is preformed by an application program interface (API).

12. The method of claim 10 further comprising the radio module remaining in the active state upon communicating data.

13. The method of claim 11 wherein the radio module is to wait for an acknowledgement from a server before entering into the dormant state.

14. A machine-readable medium having stored thereon data representing sets of instructions, the sets of instructions which, when executed by a machine, cause the machine to:
   control a radio module via a application program interface API;
   receive at a radio module via a wireless service provider network;
   activate a timer to count to a predetermined time interval upon receiving the data;
   receive timeout information via the wireless network receive to maintain the radio module in an active state; and
   override the timeout information by forcing the radio module into a dormant state from the active state upon the timer reaching the predetermined time interval, to conserve battery power.

15. The machine-readable medium of claim 14 further causes the machine to reset the timer upon the radio module communicating data.

16. The machine-readable medium of claim 14 wherein the forcing of the radio module into the dormant state is preformed by an application program interface (API).

17. The machine-readable medium of claim 15 wherein the radio module remains in the active state upon communicating data.

18. The machine-readable medium of claim 17 wherein the radio module is to wait for an acknowledgement from a server before entering into the dormant state.

* * * * *

UNITED STATES PATENT AND TRADEMARK OFFICE
CERTIFICATE OF CORRECTION

PATENT NO. : 7,590,403 B1　　　　　　　　　　　　　　　　　　　　　　　Page 1 of 1
APPLICATION NO. : 11/146820
DATED : September 15, 2009
INVENTOR(S) : House et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 498 days.

Signed and Sealed this

Twenty-first Day of September, 2010

David J. Kappos
*Director of the United States Patent and Trademark Office*